United States Patent

Morimoto et al.

[11] Patent Number: 5,906,323
[45] Date of Patent: May 25, 1999

[54] HANDLE STRUCTURE FOR DUAL-BEARING REEL

[75] Inventors: Shinichi Morimoto, Nishinomiya; Kenichi Kawasaki, Sakai, both of Japan

[73] Assignee: Shimano, Inc., Japan

[21] Appl. No.: 08/909,276

[22] Filed: Aug. 11, 1997

[30] Foreign Application Priority Data

Aug. 28, 1996 [JP] Japan .................................. 8-226735

[51] Int. Cl.⁶ .................................................. A01K 89/01
[52] U.S. Cl. ............................ 242/283; 242/319; 74/546
[58] Field of Search .................................. 242/283, 284, 242/319; 74/543, 544, 545, 546

[56] References Cited

U.S. PATENT DOCUMENTS

| | | | |
|---|---|---|---|
| 2,326,023 | 8/1943 | Fredricksen | 74/546 |
| 2,335,752 | 11/1943 | Geiger | 74/548 |
| 3,375,993 | 4/1968 | Hayes | 242/284 |
| 3,606,193 | 9/1971 | Allred | 74/546 |
| 5,064,138 | 11/1991 | Sato | 242/319 |
| 5,529,255 | 6/1996 | Asano et al. | 242/283 |
| 5,690,290 | 11/1997 | Asano et al. | 242/283 |

*Primary Examiner*—John P. Darling
*Attorney, Agent, or Firm*—Jeffer, Mangels, Butler & Marmaro LLP

[57] ABSTRACT

A handle structure for a dual-bearing reel, which is rotatably mounted on the reel unit of a dual-bearing reel and is attached to the distal end of a handle shaft provided with a drag mechanism, includes a seat plate, a fixing component for fixing the seat plate, and a handle unit. The seat plate has a periphery and is non-rotatably stopped at the distal end of the handle shaft. The fixing component is provided to the distal end of the handle shaft and fixes the seat plate such that it cannot move in the axial direction with respect to the handle shaft. The handle unit is non-rotatably stopped at the seat plate. The handle unit has a surface adjacent the reel unit and includes a housing component for housing and covering the distal end of the handle shaft.

20 Claims, 8 Drawing Sheets

FIG. 8 ically, the present invention relates to a handle struc-

HANDLE STRUCTURE FOR DUAL-BEARING REEL

FIELD OF THE INVENTION

The present invention relates to a handle structure. More particularly, the present invention relates to a handle structure for a dual-bearing reel, which is rotatably mounted on the reel unit of a dual-bearing reel and is attached to the distal end of a handle shaft, specifically a handle shaft provided at some point along its length with a drag mechanism.

BACKGROUND OF THE INVENTION

In a dual-bearing reel, in particular a dual-bearing reel having a drag mechanism on a handle shaft, the handle that is attached to the distal end of the handle shaft is usually fixed tight by a nut. An anti-rotation member is attached to this nut in order to prevent it from loosening when the star drag of the drag mechanism is reversed. This anti-rotation member is provided such that it protrudes from the surface of the handle unit on the opposite side from the reel (the handle external surface). Since this anti-rotation member protrudes from the handle unit, bait, dirt, and the like tend to adhere to the handle, and the line is also more prone to tangling, among other problems.

The dual-bearing reel disclosed in Japanese Laid-Open Patent Application 7-194280 is known as prior art that provides a solution to this problem. With this dual-bearing reel, the surface of an anti-loosening member is formed in a smooth shape from the peripheral edges all the way to the center. Forming the surface of the anti-loosening member in a smooth shape prevents dirt from adhering as much as possible, and makes the line less prone to tangling.

With the above-mentioned conventional structure, the anti-rotation member provided to the handle unit is linked smoothly to the handle unit, but because it is a separate member from the handle unit, there may be gaps between it and the handle unit on the handle external surface. If there are gaps such as these, then bait, dirt, and the like can work their way in, so dirt still tends to adhere, and line tangling can also occur if the line snags in these gaps.

A need exists for a handle structure that prevents line tangling and dirt adherence to the external handle surface as much as possible.

SUMMARY OF THE PREFERRED EMBODIMENTS

In accordance with one aspect of the present invention, there is provided a handle structure for a dual-bearing reel which is rotatably mounted on the reel unit of a dual-bearing reel and is attached to the distal end of a handle shaft provided at some point along its length with a drag mechanism. The inventive handle structure includes a seat plate, a fixing means, and a handle unit. The seat plate has a periphery and is non-rotatably stopped at the distal end of the handle shaft. The fixing means is provided to the distal end of the handle shaft and is used for fixing the seat plate such that it cannot move in the axial direction with respect to the handle shaft. The handle unit is non-rotatably stopped at the seat plate and has a surface adjacent the reel unit, and includes housing means for housing and covering the distal end of the handle shaft.

With this handle structure, the seat plate is mounted at the distal end of the handle shaft, and is fixed by the fixing means to the handle shaft. The handle unit is non-rotatably stopped at this seat plate. This handle unit has a housing component which houses and covers the distal end of the handle shaft. Accordingly, the handle external surface is smooth and free of gaps, so that adhesion of dirt to this surface or the tangling of the line on this surface is rare.

In a first preferred embodiment, a first threaded component is formed at the distal end of the handle shaft, and the fixing means is a second threaded component that meshes with the first threaded component. In this case, the seat plate can be easily fixed to the distal end of the handle shaft through the meshing of the second threaded component with the first threaded component.

In a more particular embodiment, the first threaded component is a male thread, the second threaded component is a threaded nut that meshes with the male thread, and the housing means includes anti-rotation means for preventing the nut from turning. In this case, the nut will not turn backwards and loosen even if the star drag is rotated in the opposite direction from the handle rotation direction.

In another more particular embodiment, the first threaded component is a male thread, the second threaded component is a threaded nut that meshes with the male thread, and the handle structure further includes anti-rotation means positioned between the seat plate and the handle unit for preventing the nut from turning. In this case again, the nut will not turn backwards and loosen even if the star drag is rotated in the opposite direction from the handle rotation direction.

More preferably, the male thread is provided to a small diameter component formed on the distal end of the handle shaft, and the seat plate is non-rotatably stopped at the small diameter component. In this case, the seat plate is positioned in the axial direction by the stepped portion of the small diameter component, so the seat plate can be properly fixed by the nut.

In another preferred embodiment, the handle unit includes stopping means that engages with the periphery of the seat plate. This results in a simpler structure because the handle unit is non-rotatably stopped at the seat plate by the external shape (the periphery) of the seat plate.

More particularly, the stopping means includes a depression defined in the handle unit that engages with the periphery of the seat plate. In this case, the structure of the anti-rotation means and the depression is simpler because these are formed on a single surface.

Preferably, the seat plate is stopped at the depression such that a continuous surface is formed at the surface of the handle unit adjacent the reel unit side. In this case, since the side surface on the reel unit side of the handle unit is a continuous surface, there is less line tangling there.

Also preferably, the handle unit is fixed to the seat plate by at least one screw, very preferably a plurality of screws, and the depression has a depth sufficient to conceal the heads of the screws. In this case, since the heads of the screws are hidden, there is less danger of the line tangling on the screw heads.

In a third preferred embodiment, the seat plate has an end including a bent component. The bent component is bent back at an angle with respect to the surface of the handle unit, and the handle unit is fixed to the seat plate by a screw that has been inserted from the reel unit side into the bent component. More particularly, the seat plate has two ends, each including a bent component as described herein.

In accordance with another aspect of the present invention, there is provided a handle structure for a dual-bearing reel that is rotatably mounted on the reel unit of a dual-bearing reel and is attached to the distal end of a handle shaft provided at some point along its length with a drag mechanism, wherein the handle structure includes a seat plate and a handle unit. The seat plate is non-rotatably stopped at the handle shaft. The handle unit has a stop component that is non-rotatably stopped at the seat plate, a threaded component that is fixed to the handle shaft, and a housing component which houses and covers the distal end of the handle shaft.

With this handle structure, the threaded component of the handle unit is made to mesh with the handle shaft in a state in which the seat plate is mounted on the handle shaft, which fixes the handle unit and the handle shaft. The seat plate is positioned at the stop component, which prevents the handle unit from turning with respect to the handle shaft. This handle unit has a housing component that houses and covers the distal end of the handle shaft. Accordingly, the handle external surface is smooth and free of gaps, so the adhesion of dirt to this surface or the tangling of the line on this surface is rare.

In one preferred embodiment, the handle shaft has a polygonal, preferably hexagonal component at its distal end and a female thread component defined in its distal end. The seat plate is non-rotatably stopped at the polygonal component, and the threaded component meshes with the female thread component. In this case, the threaded component of the handle unit is prevented from turning by the seat plate, which is stopped at the polygonal component.

More particularly, the handle shaft has defined on the base side of the polygonal, preferably hexagonal component, a groove having a diameter smaller than the diameter of the inscribed circle of the polygonal component. The seat plate is adapted to rotate in the groove. In this case, since the seat plate is disposed in the groove, it can be rotated to any position, and the seat plate can be properly stopped at the handle unit in a state in which the handle unit is threaded into the handle shaft.

In another preferred embodiment, the handle shaft has a peripheral surface on which parallel chamfers and a male thread component are defined, the seat plate is non-rotatably stopped at the chamfers, and the threaded component meshes with the male thread component. In this case, the threaded component of the handle unit is prevented from turning by the seat plate, which preferably has a bent component at which the seat plate is stopped.

In accordance with a further aspect of the present invention, there is provided a dual-bearing reel that includes a reel unit, a handle shaft, and a handle structure. The handle shaft is rotatably supported by the reel unit and has a distal end. The handle structure includes a seat plate having a periphery, fixing means and a handle unit as described herein.

Preferably, the handle unit further includes stopping means for stopping the seat plate. The stopping means preferably comprises a depression defined in the surface of the handle unit adjacent the reel unit. The depression has a shape that conforms to and engages the periphery of the seat plate.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
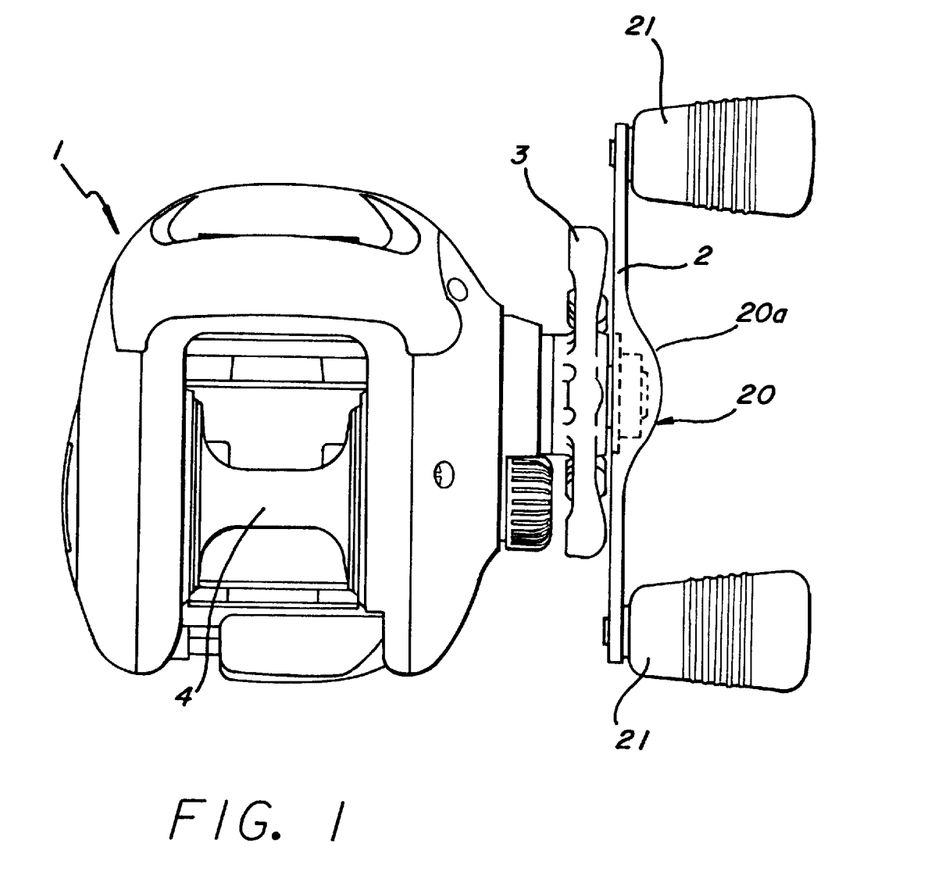
FIG. 1 is a plan view of a dual-bearing reel that employs a first embodiment of the present invention.

In FIG. 1, a dual-bearing reel that employs an embodiment of the present invention comprises a reel unit 1, a spool rotating handle structure 2 that is positioned to the side of the reel unit 1, and a drag-adjusting star drag 3 that is positioned on the reel unit 1 side of the handle structure 2.

A spool 4 is rotatably supported inside the reel unit 1. A drive mechanism (not shown) is positioned between the spool 4 and the handle structure 2.

Figure 2:
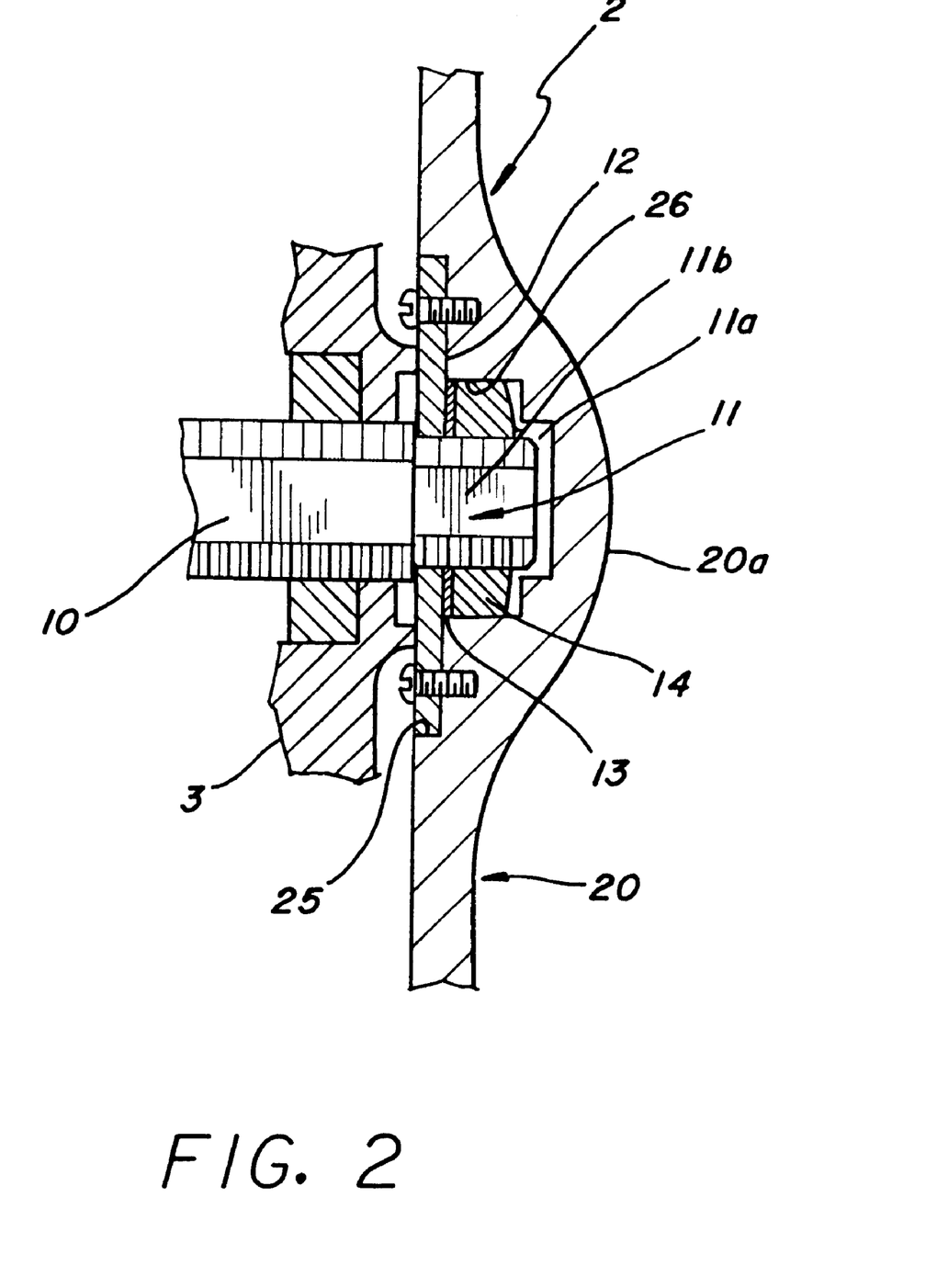
FIG. 2 is a detail cross section of the handle structure thereof.

As shown in FIG. 2, the handle structure 2 is fixed to the distal end of a handle shaft 10 that is rotatably supported by the reel unit 1. A small diameter component 11, whose diameter is smaller than the other portion, is formed at the distal end of the handle shaft 10. A male thread component 11a is formed around the outside of the small diameter component 11. The small diameter component 11 has a surface which is provided with parallel chamfers. As a result of this chamfered surface, the cross section of the small diameter component 11 is oblong.

Handle structure 2 includes a seat plate 12 which is non-rotatably stopped at the small diameter component 11. The seat plate 12 is fixed via a washer 13 to the small diameter component 11 by a nut 14 that threads onto the male thread component 11a.

Figure 3:
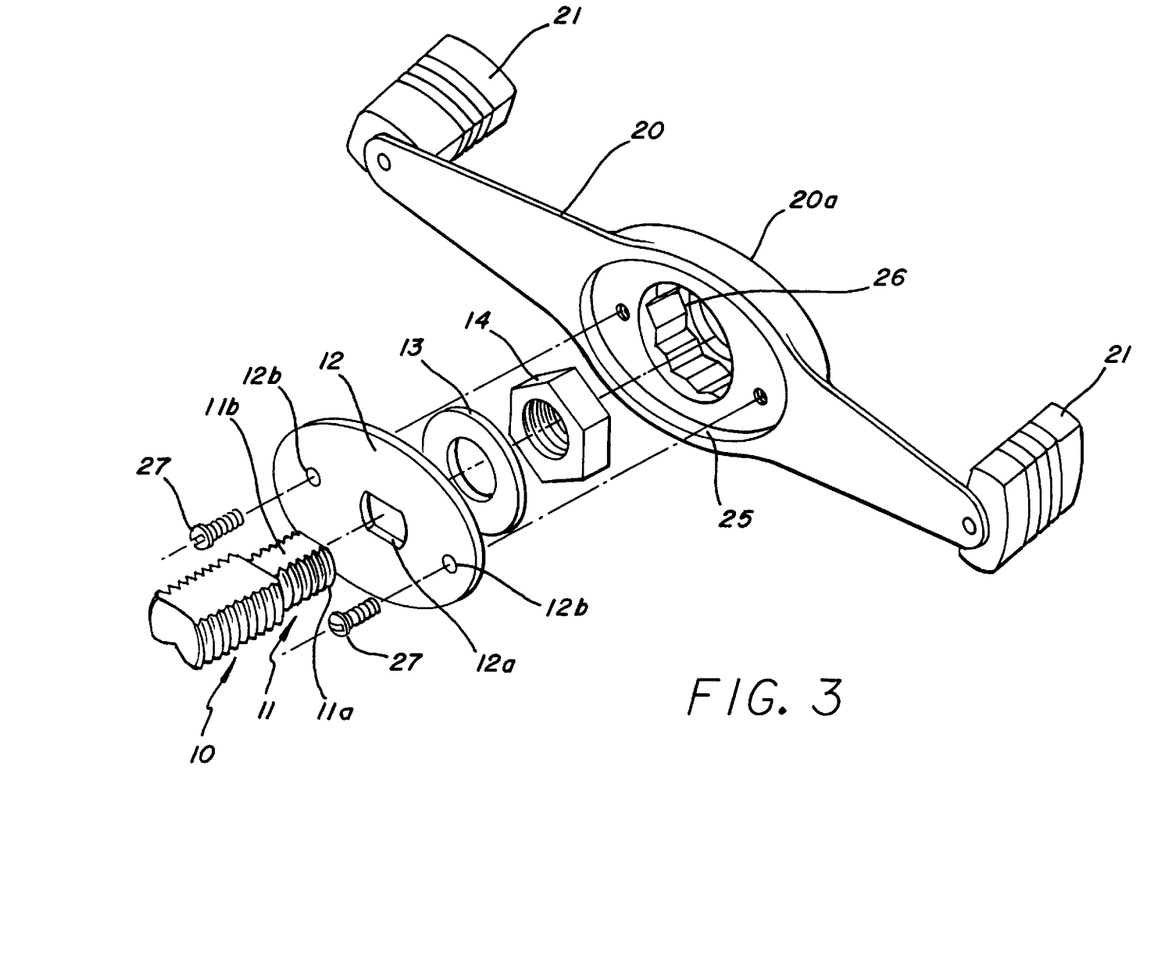
FIG. 3 is an exploded oblique view of the handle structure.

As shown in FIG. 3, the seat plate 12 preferably is a flat member that is roughly oblong in shape, in the center of which is formed an oblong hole 12a that engages with the external shape of the small diameter component 11. Round holes 12b are formed to the sides of the oblong hole 12a.

Meanwhile, as shown in FIG. 1, the handle structure 2 includes a handle unit 20, and grips 21 that are mounted on the ends of the handle unit 20. Housing means 20a, preferably having the configuration of a gently rising protrusion, is formed in the center on the outside of the handle unit 20.

As shown in FIG. 2, a first depression 25 and a second depression 26, which is smaller and deeper, are formed on the inside of the protrusion 20a. The first depression 25 preferably is an oval depression shaped so as to engage with the periphery of the seat plate 12, and its depth is equivalent to the thickness of the seat plate 12. The second depression 26 is an anti-rotation depression that stops the nut 14, preferably in increments of 30 degrees, for instance, and its depth is slightly greater than the length of the small diameter component 11 of the handle shaft 10. The protrusion 20a is formed on the external surface of handle unit 20 so as to accommodate these depressions 25 and 26. The small diameter component 11 at the distal end of the handle shaft 10 is housed within this second depression 26.

The seat plate 12 is fixed to the handle unit 20 by screws 27. Also, the seat plate 12 is non-rotatably stopped by the first depression 25. Furthermore, the seat plate 12 is non-rotatably mounted on the small diameter component 11 by means of the oblong hole 12a, as mentioned above.

When a handle structure as described above is employed to attach the handle unit 20 to the handle shaft 10, the first step is to fit the seat plate 12 onto the small diameter component 11 of the handle shaft 10, put a washer 13 over it, and thread the nut 14 onto the male thread component 11a so as to fix the seat plate 12 to the handle shaft 10. The handle unit 20 is then placed over the nut 14, and the distal end of the handle shaft 10 is covered. At this point, the seat plate 12 fits into the first depression 25, and the nut 14 fits into the second depression 26. If these do not fit, the nut 14 may be loosened slightly. The seat plate 12 is then fixed to the handle unit 20 by the screws 27.

When the handle structure 2 is attached to the handle shaft 10 in this manner, the smooth, continuous external surface of the handle unit 20 makes it more unlikely that bait, dirt, or the like will adhere thereto. There is also less tangling of the fishing line in the event that the line should come to the handle external surface.

Figure 4:
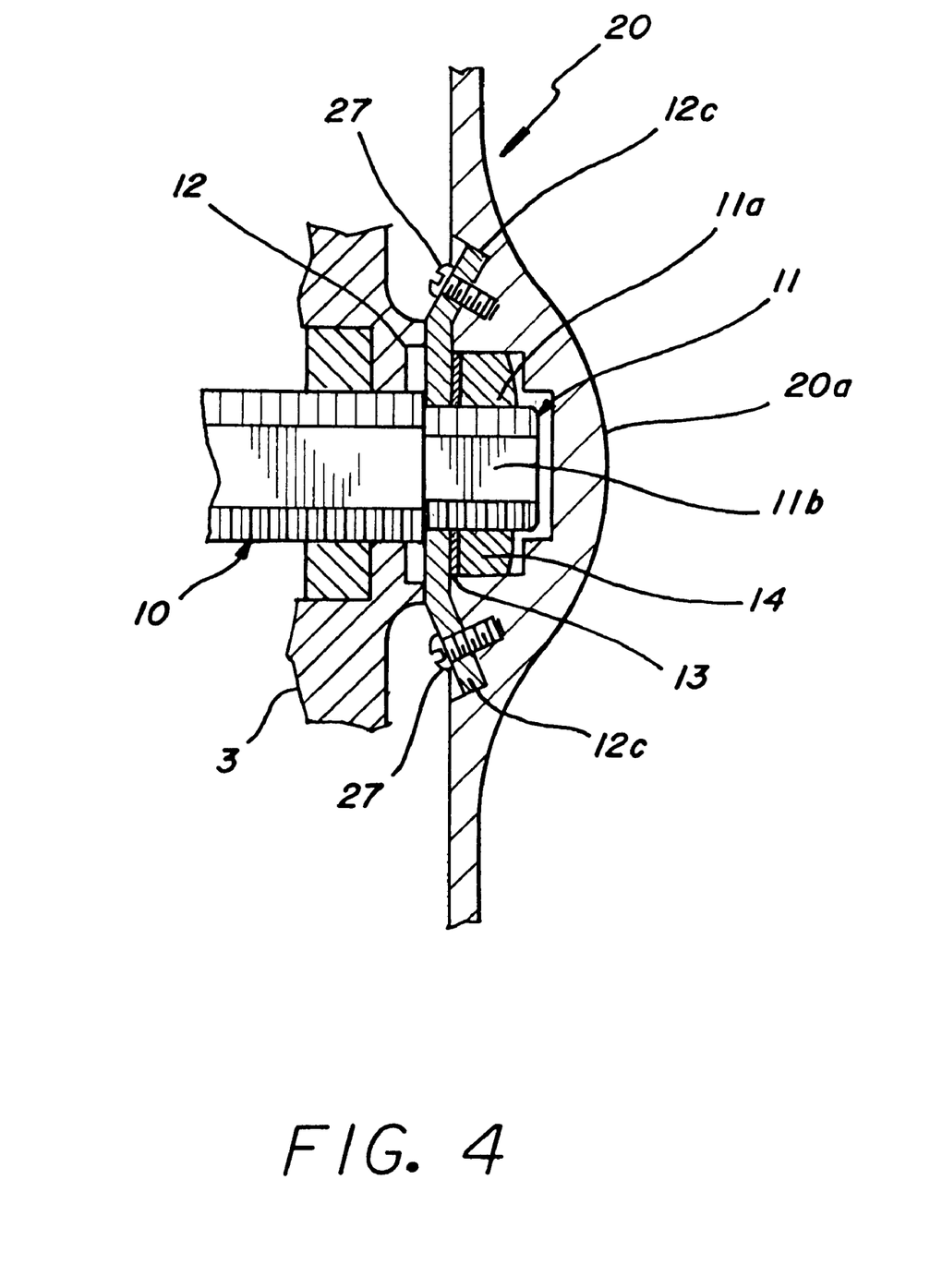
FIG. 4 is a cross section of a second embodiment of a handle structure of the present invention, showing a seat plate with two bent ends.

In an alternative embodiment, shown in FIG. 4, seat plate 12 includes a bent component 12c that is bent back slightly to the handle structure 2 side. The bent component 12c may be formed on both ends of the seat plate 12. In this case, the heads of the screws 27 will face outward, making it easier to turn the screws 27 during the fixing of the seat plate 12 to the handle unit 20 with the screws 27.

Figure 5:
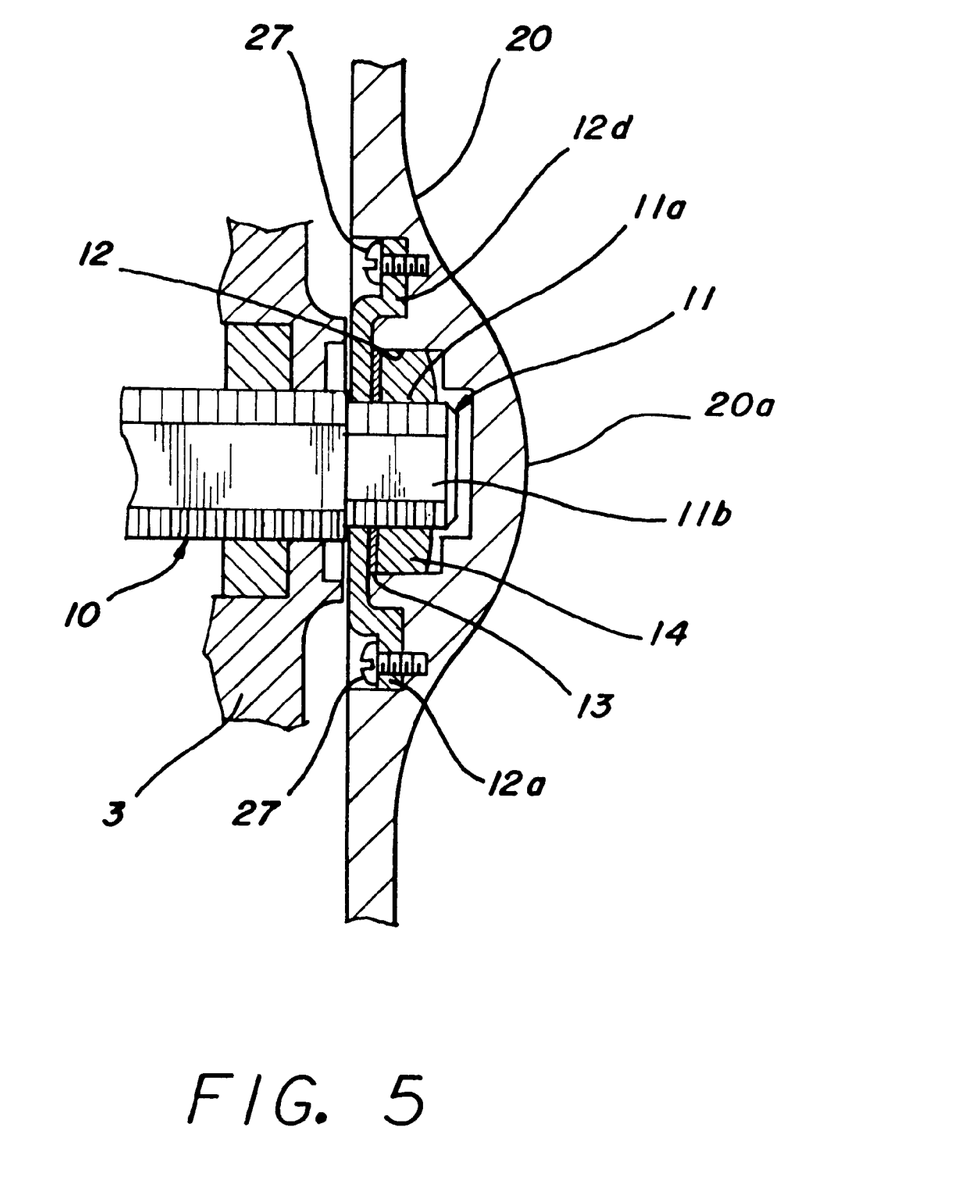
FIG. 5 is a cross section of another embodiment of the handle structure of the invention, showing concealed screw heads.

In another alternative embodiment, shown in FIG. 5, a stepped bent component 12d that is bent in a step may be formed on one or both ends of the seat plate 12 so that the heads of the screws 27 are hidden inside the handle unit 20. In this case, nothing will protrude from the reel unit 1 side of the handle unit 20, and there will be less line tangling on the reel unit 1 side as well.

Figure 6:
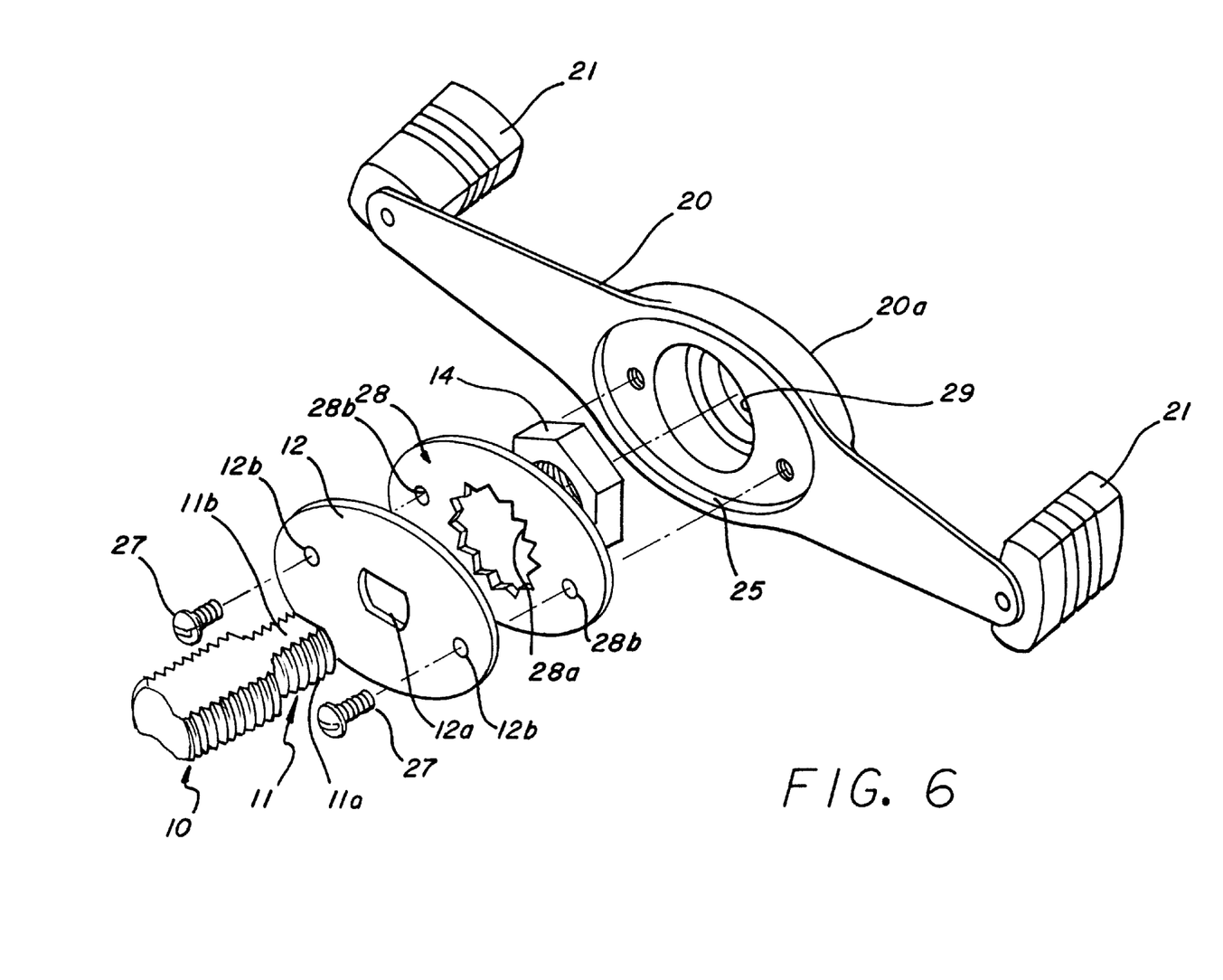
FIG. 6 is a an exploded oblique view of another handle structure of the invention in which an anti-rotation member is located between the seat plate and the handle unit.

As shown in FIG. 6, an anti-rotation member 28 may be positioned between the seat plate 12 and the handle unit 20 instead of using the handle unit 20 to prevent the nut 14 from turning. The anti-rotation member 28 has roughly the same outside diameter as the seat plate 12, and is non-rotatably stopped along with the seat plate 12 at the first depression 25. A stop hole 28a that stops the nut 14 in increments of 30 degrees, for instance, is formed in the center of the anti-rotation member 28. Round holes 28b into which the screws 27 can be inserted are formed to the sides of the stop hole 28a.

A housing hole 29 for housing the small diameter component 11 of the handle shaft 10 or the nut 14 is formed in the handle unit 20.

When this structure is employed to attach the handle structure 2 to the handle shaft 10, the seat plate 12 is fitted onto the small diameter component 11 of the handle shaft 10, and the nut 14 is threaded onto the male thread component 11a, which fixes the seat plate 12 to the handle shaft 10. The anti-rotation member 28 is then mounted on the nut 14, after which the handle unit 20 is placed over the nut 14 so as to cover the distal end of the handle shaft 10. The seat plate 12 and the anti-rotation member 28 are then fixed to the handle unit 20 by the screws 27.

Again in this embodiment, the handle external surface of the handle unit 20 is a smooth, continuous surface that is free of gaps, which makes it difficult for bait, dirt, or the like to adhere thereto. There is also less tangling of the fishing line in the event that the line should come to the handle external surface.

Figure 7:
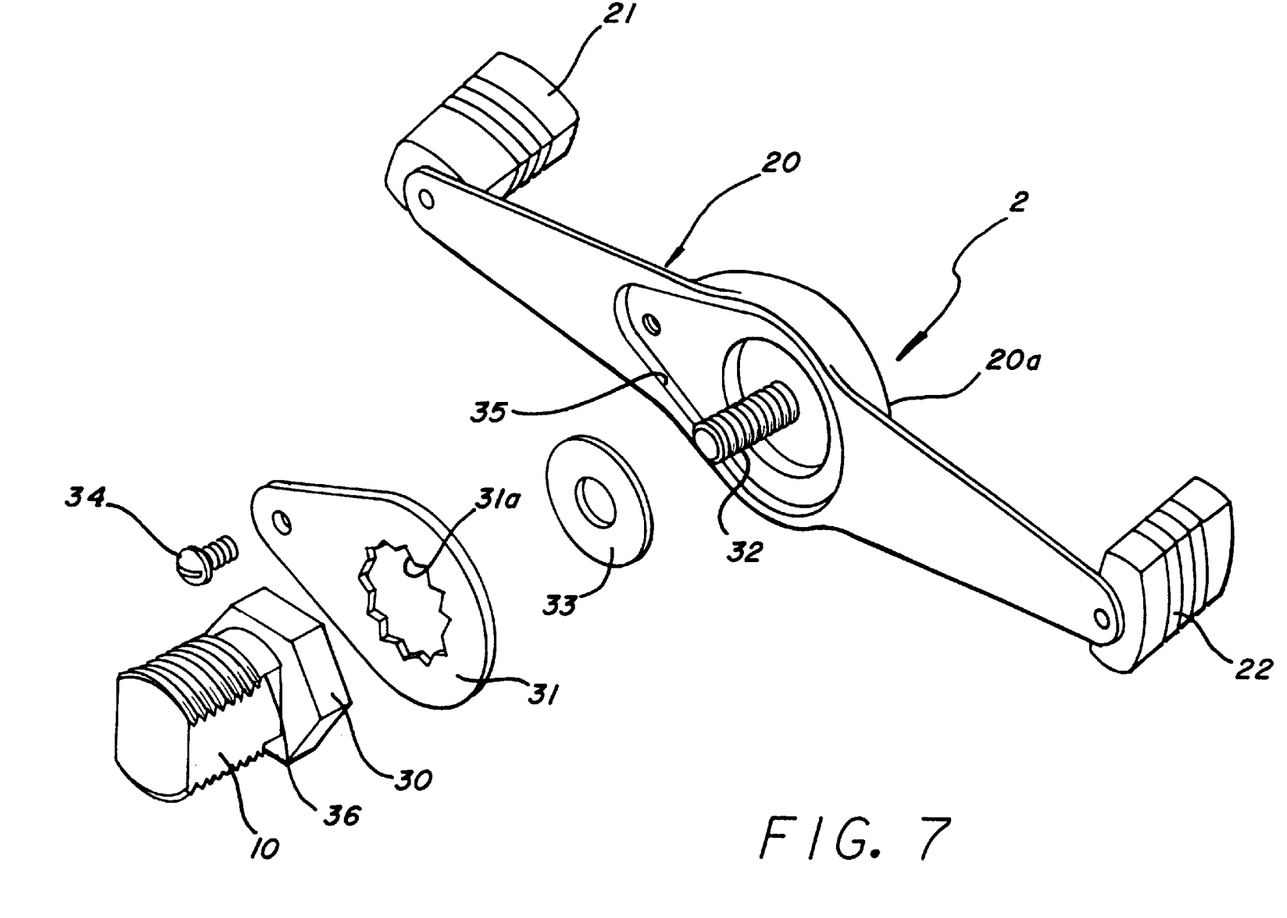
FIG. 7 is an exploded oblique view of another handle structure of the invention in which the handle unit includes integral fixing means.

FIG. 7 shows another alternative embodiment of the handle structure of the invention. Handle structure 102 includes handle unit 120, which is fixed to the handle shaft 10 by fixing means provided integrally to the handle unit 120, rather than the seat plate 12 being fixed to the handle shaft 10 by a fixing means. In this embodiment, an anti-rotation polygonal, preferably hexagonal component 30 is formed at the distal end of the handle shaft 10, and a seat plate 31 is non-rotatably stopped in the polygonal component 30. The circumscribed circle of the polygonal component 30 is smaller than the diameter of the handle shaft 10, and a groove 36 whose diameter is smaller than the inscribed circle of the polygonal component 30 is formed on the base side of the polygonal component 30.

A stop hole 31a that is stopped at the polygonal component 30 is formed in the center of the seat plate 31. A threaded hole (not shown) is formed in the distal end of the handle shaft 10. A male thread component 32 (fixing means) that meshes with this threaded hole is provided such that it extends from the center of the handle unit 120 toward the reel unit 1 side. The male thread component 32 is fixed to the handle shaft 10 via a washer 33. The seat plate 31 is fixed to the handle unit 120 by a screw 34. A depression 35 that engages with the periphery of the seat plate 31 is formed on the side surface of the handle unit 120 on the reel unit 1 side. When the seat plate 31 is fitted into this depression 35, the seat plate 31 is non-rotatably stopped. Also, the seat plate 31 is non-rotatably stopped at the polygonal component 30 via the stop hole 31a.

When this structure is employed to attach the handle structure 102 to the handle shaft 10, the first step is to fit the seat plate 31 into the polygonal component 30 of the handle shaft 10, put the washer 33 over this, and thread the male thread component 32 of the handle unit 120 into the female threads, which fixes the handle unit 120 to the handle shaft 10. If the periphery of the seat plate 31 does not register within the depression 35 in this state, then the seat plate 31 is turned in the groove component 36 until it registers within the depression 35. When the seat plate 31 is matched to the depression 35, it is fixed to the handle unit 120 by the screw 34.

Again in this embodiment, a gentle protrusion 120a is formed in the surface of the handle unit 120 on the opposite side from the reel unit 1. Accordingly, a smooth, continuous surface is formed on the side of the handle unit 120 opposite the reel unit 1, which makes it difficult for bait, dirt, or the like to adhere thereto, and makes line tangling less likely.

Figure 8:
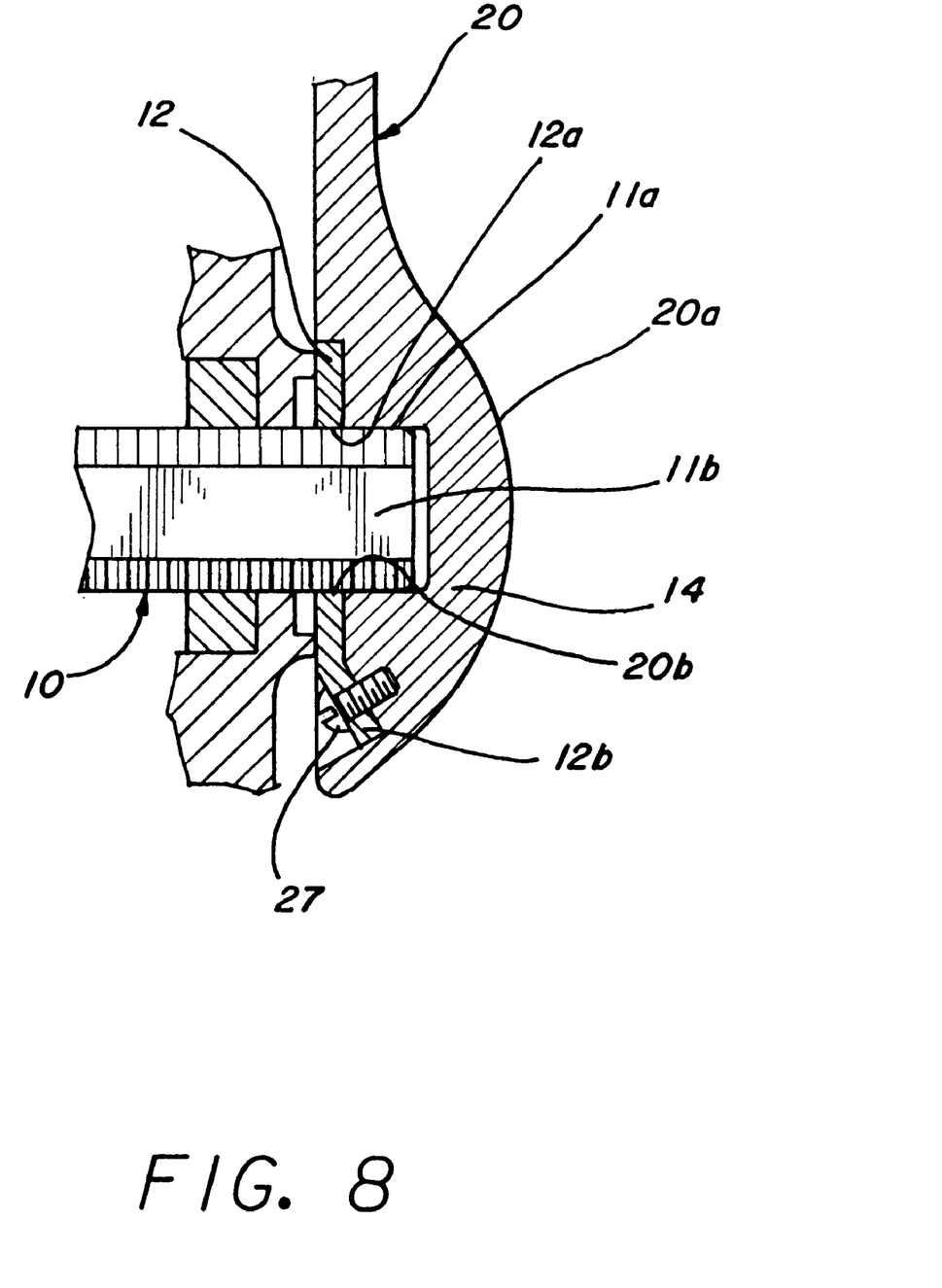
FIG. 8 is a cross section of an alternative single-arm handle embodiment of the invention.

The handle configuration to which the present invention is applied is not limited to a double-handle as in the above embodiments, and the present invention can also be applied to a single-arm handle structure 202, as shown in FIG. 8. Here again, the fixing means is provided integrally to the handle unit 220. Parallel chamfers 211b and a male thread component 211a are formed around the outer periphery of the handle shaft 10, and an oblong hole 212a that engages with the chamfers 211b is formed in the seat plate 212. Also, a female thread component 220b (fixing means) that meshes with the male thread component 211a is formed on the reel unit 1 side of the handle unit 220. The rest of the structure is the same as in the above embodiments, and so will not be described here.

The stopping structure between the seat plate and the handle shaft is not limited to the above embodiments, and any structure with which the seat plate is non-rotatably stopped at the handle shaft may be employed.

The fixing structure between the seat plate and the handle shaft is not limited to the above embodiments, and any structure with which the seat plate is fixed to the handle shaft may be employed.

The anti-rotation structure of the nut or other fixing means is not limited to a depression structure, and may instead be a protrusion structure.

What is claimed is:

1. A handle structure for a dual-bearing reel, which is rotatably mounted on a reel unit of a dual-bearing reel and is attached to the distal end of a handle shaft provided with a drag mechanism, wherein said handle structure comprises:
    (a) a seat plate that has a periphery and that is non-rotatably stopped at said distal end of said handle shaft;
    (b) fixing means provided to said distal end of said handle shaft for fixing said seat plate such that it cannot move in the axial direction with respect to said handle shaft; and
    (c) a handle unit that is non-rotatably stopped at said seat plate, said handle unit having a surface adjacent said reel unit and including housing means for housing and covering said distal end of said handle shaft.

2. A handle structure for a dual-bearing reel as defined in claim 1, wherein said distal end of said handle shaft has formed therein a first threaded component, and wherein said fixing means is a second threaded component that meshes with said first threaded component.

3. A handle structure for a dual-bearing reel as defined in claim 2, wherein said first threaded component is a male thread, and said second threaded component is a threaded nut that meshes with said male thread, and wherein said housing means comprise anti-rotation means for preventing said nut from turning.

4. A handle structure for a dual-bearing reel as defined in claim 3, wherein said male thread is provided to a small diameter component formed on said distal end of said handle shaft, and said seat plate is non-rotatably stopped at said small diameter component.

5. A handle structure for a dual-bearing reel as defined in claim 3, wherein said handle unit comprises stopping means that engages with said periphery of said seat plate.

6. A handle structure for a dual-bearing reel as defined in claim 5, wherein said stopping means includes a depression defined in said handle unit that engages with said periphery of said seat plate.

7. A handle structure for a dual-bearing reel as defined in claim 6, wherein said seat plate is stopped at said depression such that a continuous surface is formed at said surface of said handle unit adjacent said reel unit.

8. A handle structure for a dual-bearing reel as defined in claim 6, wherein said handle unit is fixed by at least one screw to said seat plate, and said depression has a depth sufficient to conceal the head of said screw.

9. A handle structure for a dual-bearing reel as defined in claim 6, wherein said handle unit is fixed by a plurality of screws to said seat plate, and said depression has a depth sufficient to conceal the heads of said screws.

10. A handle structure for a dual-bearing reel as defined in claim 2, wherein said first threaded component is a male thread, and said second threaded component is a threaded nut that meshes with said male thread, and wherein said handle structure further comprises anti-rotation means positioned between said seat plate and said handle unit for preventing said nut from turning.

11. A handle structure for a dual-bearing reel as defined in claim 10, wherein said male thread is provided to a small diameter component formed on said distal end of said handle shaft, and said seat plate is non-rotatably stopped at said small diameter component.

12. A handle structure for a dual-bearing reel as defined in claim 1, wherein said handle unit comprises stopping means that engages with said periphery of said seat plate.

13. A handle structure for a dual-bearing reel as defined in claim 1, wherein said seat plate has an end including a bent component that is bent back at an angle with respect to said surface of said handle unit, and wherein said handle unit is fixed to said seat plate by a screw that is inserted into said bent component.

14. A handle structure for a dual-bearing reel as defined in claim 13, wherein said seat plate has two ends each including a bent component that is bent back at an angle with respect to said surface of said handle unit, and wherein said handle unit is fixed to said seat plate by screws that are inserted into each said bent component.

15. A handle structure for a dual-bearing reel, which is rotatably mounted on a reel unit of a dual-bearing reel and is attached to the distal end of a handle shaft provided with a drag mechanism, wherein said handle structure comprises:
    (a) a seat plate that is non-rotatably stopped at said handle shaft; and
    (b) a handle unit comprising
        (i) a stop component that is non-rotatably stopped at the above-mentioned seat plate,
        (ii) a threaded component that is fixed to said handle shaft, and
        (iii) a housing component which houses and covers said distal end of said handle shaft.

16. A handle structure for a dual-bearing reel as defined in claim 15, wherein said handle shaft comprises a polygonal component at its distal end and a female thread component defined in its distal end, said seat plate is non-rotatably stopped at said polygonal component, and said threaded component meshes with said female thread component.

17. A handle structure for a dual-bearing reel as defined in claim 16, wherein said handle shaft has defined on the base side of said polygonal component a groove having a diameter smaller than the diameter of the inscribed circle of said polygonal component, and wherein said seat plate is adapted to rotate in said groove.

18. A handle structure for a dual-bearing reel as defined in claim 15, wherein said handle shaft has a peripheral surface on which parallel chamfers and a male thread component are defined, said seat plate is non-rotatably stopped at said chamfers, and said threaded component meshes with said male thread component.

19. A dual-bearing reel comprising:
    (a) a reel unit;

(b) a handle shaft that is rotatably supported by said reel unit and that has a distal end; and (c) a handle structure which comprises
  (i) a seat plate that has a periphery and that is non-rotatably stopped at said distal end of said handle shaft,
  (ii) fixing means provided to said distal end of said handle shaft for fixing said seat plate such that it cannot move in the axial direction with respect to said handle shaft, and
  (iii) a handle unit that is non-rotatably stopped at said seat plate, said handle unit having a surface adjacent said reel unit and including housing means for housing and covering said distal end of said handle shaft.

20. The reel of claim 19 wherein said handle unit further comprise stopping means for stopping said plate, said stopping means comprising a depression defined in said surface of said handle unit adjacent said reel unit, said depression having a shape that conforms to and engages said periphery of said seat plate.

* * * * *